Feb. 1, 1966    W. HOLZER ETAL    3,233,135
MOTOR WITH A DISPLACEABLE ROTOR
Filed Feb. 18, 1963
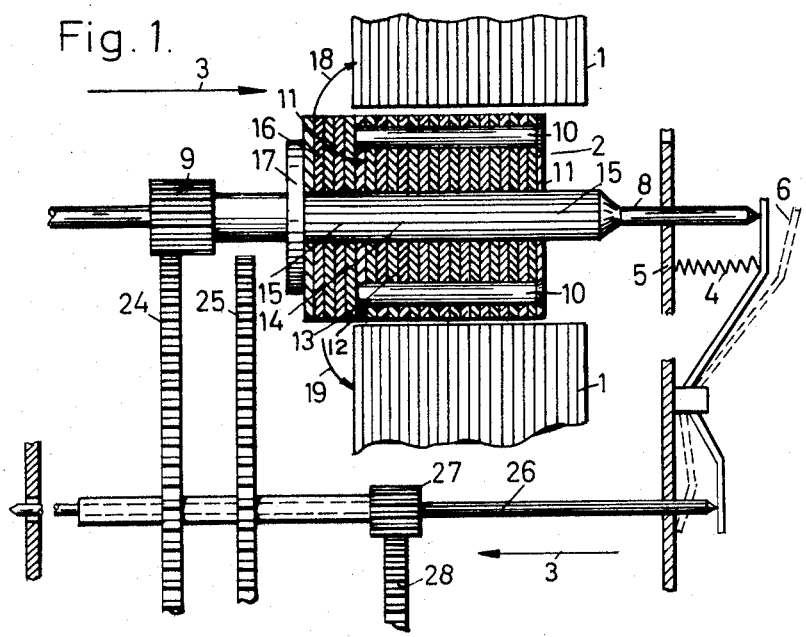
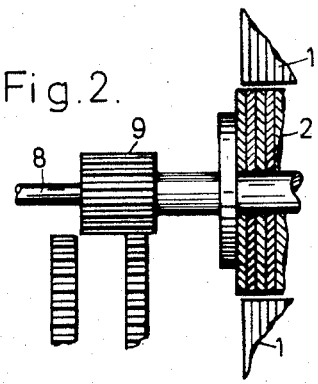
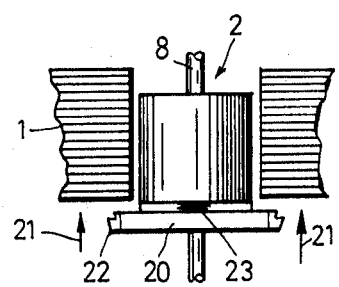
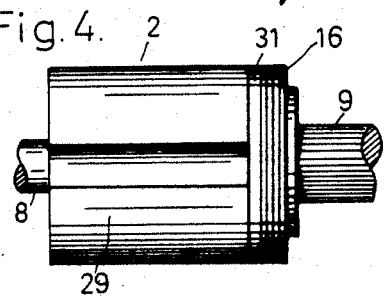
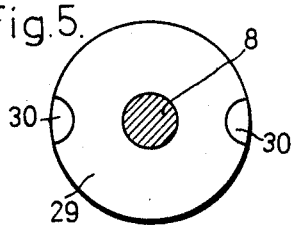
INVENTOR:
WALTER HOLZER
HANS STREHL
By Toulmin & Toulmin
Attorneys

United States Patent Office 3,233,135
Patented Feb. 1, 1966

3,233,135
MOTOR WITH A DISPLACEABLE ROTOR
Walter Holzer, Drosteweg 19, Meersburg (Bodensee), Germany, and Hans Strehl, Friedrichstrasse 52, Konstang (Bodensee), Germany
Filed Feb. 18, 1963, Ser. No. 259,257
Claims priority, application Germany, Feb. 21, 1962, H 44,947
1 Claim. (Cl. 310—209)

The invention relates to a motor with a displaceable rotor which performs different functions in at least two positions.

The invention aims to provide simple means on the rotor and/or stator enabling the rotor to be subjected to a displacement force which remains substantially constant along the displacement path.

It is known to mount a rotor for displacement in the yoke of a magnet. Known constructions make use of a spring which loads the rotor shaft. When the rotor is drawn into the yoke of the magnet it tensions the spring and, for example when the magnetic field is weak, the spring moves the rotor far enough out of the yoke for a pinion on the rotor shaft to be uncoupled from one set of gearing and become coupled with another set. The disadvantage of this construction is that, when the rotor is in the yoke and the spring is tensioned, the condition is extremely unstable. The rotor tends to withdraw again because, when it is within the yoke, the retaining force of the magnetic field is comparatively weak whereas the loaded spring applies a force which endeavours to move the rotor out. The characteristics of the displacement force as a function of the displacement path are such that when the rotor is in the yoke of the magnet the counterforce exerted by the spring is at its greatest and the retaining force of the yoke is at its weakest. Conversely, when the rotor is withdawn by the spring as the magnetic field weakens, the rotor tends to move out of this position back into the magnetic field, since the spring force holding it in the withdrawn position is not very strong in relation to the attracting force of the magnetic field. Thus, both rotor positions are unstable and there is a tendency, for example in the case of vibrations or voltage fluctuations, for the desired rotator position to vary unintentionally.

The aim of the invention is to avoid this disadvantage and to provide means for giving the rotor a characteristic making the two operative positions sufficiently stable.

According to the invention the rotor, apart from the usual rotor packet, contains at least one additional magnetically conductive shunt to prevent the displacement force from declining when the rotor is drawn into the magnetic yoke.

This construction permits the magnetic force that tends to draw the rotor into the yoke of the magnet to be increased by magnetic shunts at the very moment when the spring is most strongly loaded in the opposite direction. The rotor thereby gains a stable position of engagement with a coupling or with some functioning zone when it is drawn in. When the rotor is moved out of the yoke by the spring, as caused by intentional weakening of the magnetic field, for example when the rotor is to be moved into a different operative position, the force from the magnetic shunts simply abates or drops to a level so that a stable rotor position is also provided when the rotor is withdrawn.

There are a variety of constructions for the magnetic shunts. They may be in the form of discs which are placed on the shaft adjoining the rotor packet. This construction is easy to manufacture.

If the rotor is a squirrel-cage rotor, the magnetically conductive discs are located outside the rotor cage. However the rotor can, according to the invention, equally well be in the form of a permanent-magnet synchronous rotor, with the magnetic shunt again mounted outside the rotor packet.

There are also several possible embodiments for the diameter of the discs. One is for the discs to have the same diameter as the rotor packet. Another desirable construction is for at least some of the magnetically conductive discs to be larger in diameter than the rotor packet and to approach the end faces of the magnetic yoke.

The effect of this construction is as if a magnet were placed on the rotor and not actually drawn into the air gap of the yoke but brought near the end faces thereof. The magnet, which acts only in an axial direction, i.e. longitudinally of the displacement path, can be given any desired characteristic in that the discs, which are fixed to the rotor packet and are fixedly mounted for rotation or for displacement or pressed against the rotor packet by a spring, may have different diameters and different spacings from the yoke. Another possibility is to mount several packets of magnetically conductive discs on the rotor. These shunt-forming discs can be of different thicknesses and spaced differently from one another. They can be formed by magnetically conductive metal plates if it is desired to reduce eddy-current losses by way of lamination.

It is important for the spacings between and/or the thicknesses of the packets of plates to be such that the displacement force remains substantially constant along the displacement path.

Examples of the invention are illustrated in the accompanying drawing, wherein:

FIG. 1 is a part-sectional elevation of a rotor with diagrammatically indicated spring and a magnetic yoke without a winding, a rotor pinion being engaged with two gears;

FIG. 2 is the same view but not in section and showing the rotor drawn further into the yoke with the pinion disengaged from one of the gears;

FIG. 3 is a diagram wherein a magnet is mounted on the rotor to hold it in its fully engaged position;

FIG. 4 shows a permanent magnet rotor with additional plates, a non-magnetic disc being mounted between the rotor and the additional plates, and FIG. 5 is an end elevation of the rotor of FIG. 4.

FIG. 1 shows the magnetic yoke 1 in which the rotor 2 is reciprocated in the direction of the arrows 3. A spring 4 is biassed relatively to its attachment point 5 by the rotor 2 moving a lever in the position shown in dotted lines. When the magnetic force is reduced, for example by diminishing the exciting current through the yoke 1, the spring 4 moves a lever into the position shown in full lines and pushes the rotor in the full line position shown in FIGURE 1. In the illustrated example, a pinion 9 on the rotor shaft 8, selectively engages two gears 24, 25 of different reduction ratios in one or other displaced position of the rotor 2. Mounted on the output shaft 26 is an output pinion 27 which meshes with an output gear 28.

The rotor shown in FIG. 1 is a squirrel-cage rotor, its winding being formed by copper bars 10 which are short-circuited by copper discs 11, 12. The rotor packet 13 is formed by laminated sheet-metal discs which are attached to the core 15 of the rotor by pressing onto the rifled surface 14.

The magnetic shunt is formed by four sheet-metal discs 16 mounted adjacent the copper disc 12, an end disc 17 serving to secure the rotor packet and the sheet-metal discs 16 is position relatively to the pinion 9.

A comparison with FIG. 2 will show that the magnetic resistance in the magnetic circuit is reduced when the rotor 2 is drawn into the yoke of the magnet. It is now that the spring 4 exerts its greatest counterforce.

The lines of force can additionally flow through the magnetic shunt formed by the sheet-metal discs 16. In the withdrawn position, the sheet-metal discs 16 are outside the range of action of the yoke 1 and the lines of force flow in the directions of the arrows 18, 19 so that in this state the counterforce to the spring 4, which is now exerting its weakest counterforce, is small.

This construction makes the resultant characteristic of the displacement force substantially constant along the whole displacement path.

In FIG. 3 an additional magnet 20 is included as a magnetic shunt. The magnet may again be formed by sheet-metal discs similar to 16 but now the force of attraction of the magnet acts in the direction 21, i.e. directly opposite to the force of the spring 4. The magnet 20 may be formed by round or cruciform plates or by plates of any other design. It can be an arrangement of permanent magnets if the force of attraction corresponding to the characteristic of the spring 4 is to be further increased. The magnet 20 could be mounted for rotation on the shaft 8. The discs may be of different diameters so as to form steps 22 which may also be used to alter the magnetic characteristic. An additional spring 23 may also be provided; as the magnet 20 approaches the yoke 1 the spring then allows it to be attracted abruptly and thus ensures one engagement position, and when the magnet drops off it moves away from the yoke 1 equally abruptly and the rotor 2 moves into the other engagement position.

In FIGS. 4 and 5, the rotor 2 is formed by permanent magnets 29 having pole-forming grooves 30 but other known means can be used to form the poles. A non-magnetic disc 31 is arranged between the permanent magnets 29 and the sheet-metal discs 16.

The invention can be applied to all cases where the displaceable rotor of a motor is required to remain securely in one or more engagement positions until the position is changed by external influence such as an alteration in the magnetic field or in the biassing of a spring.

By appropriate stepping of the yoke, the rotor can of course be given a plurality of engagement positions and not only two as in the example.

What is claimed is:

A constant speed squirrel cage induction motor comprising a field electromagnet having a yoke, a rotor having first and second stacks of feromagnetic laminations mounted on a shaft which projects outwardly from opposite ends of the rotor, said first stack of laminations having a plurality of conductive rods extending axially through said first stack and a conductive shorting ring at each end of said first stack conductively engaging the end portions of said rods at the appertaining end of the rotor, one end of said second stack of laminations mounted adjacent and contiguous to the shorting ring at one end of said first stack and being free of armature windings and coils, a pinion gear mounted on one end of said shaft adjacent an end disc which is compressively connected with the other end of said second stack, and a spring biased against the outermost extremity of the other end of said shaft and exerting axial force against said rotor, said rotor having two different operational positions, said second stack of laminations neutralizing the force of the spring while the rotor packet is mounted thereagainst to thereby hold the rotor packet in a stable first position, and said spring operating upon a stepping down of the field excitation current to shift the rotor packet into a second operating stable position.

References Cited by the Examiner
UNITED STATES PATENTS

| | | | |
|---|---|---|---|
| 1,650,142 | 11/1927 | Martin | 310—243 |
| 2,345,778 | 4/1944 | Van Lammeren et al. | 310—209 X |
| 2,748,334 | 5/1956 | Miller | 310—209 X |
| 2,810,085 | 10/1957 | Akeley | 310—126 X |
| 2,869,008 | 1/1959 | Carlsen | 310—211 X |
| 2,915,254 | 12/1959 | Weber et al. | 242—45 |

ORIS L. RADER, *Primary Examiner.*

MILTON O. HIRSHFIELD, *Examiner.*

J. J. SWARTZ, *Assistant Examiner.*